H. O. CLARK.
ENGINE STARTER.
APPLICATION FILED JUNE 8, 1917.
1,267,974.
Patented May 28, 1918.
2 SHEETS—SHEET 1.
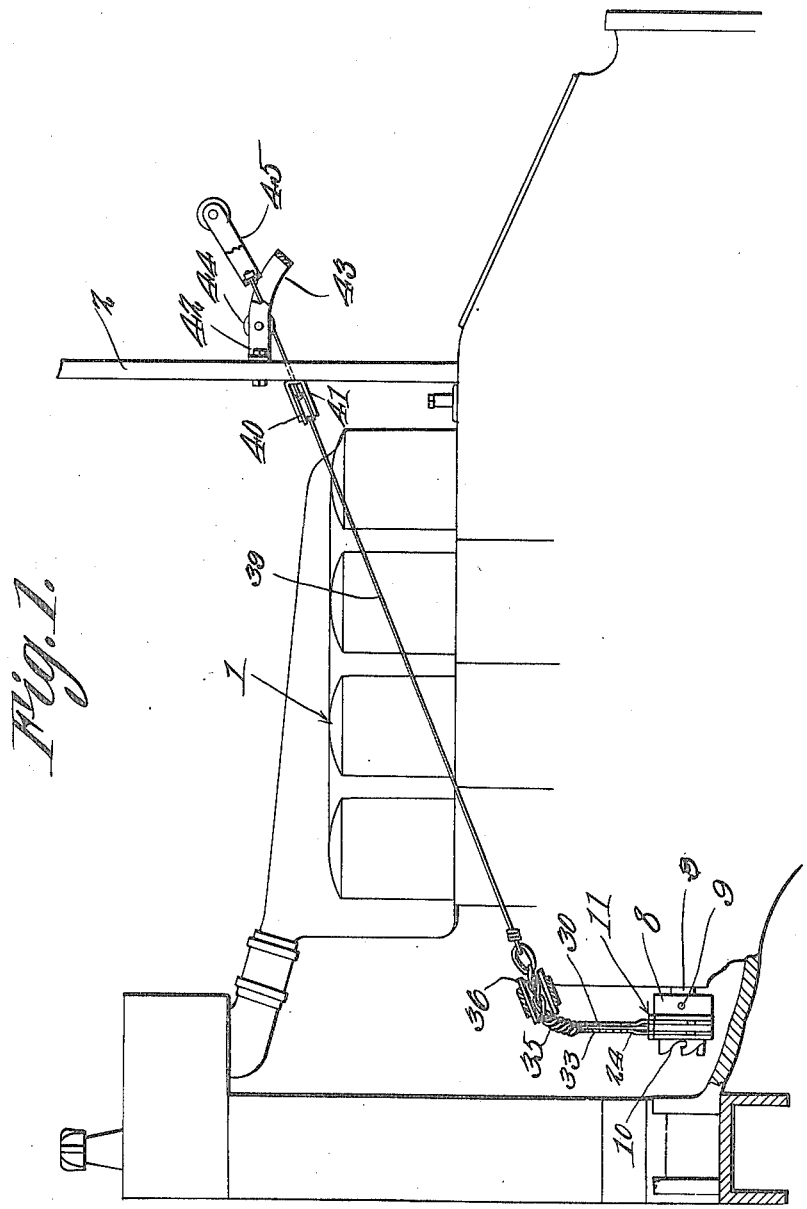

H. O. CLARK.
ENGINE STARTER.
APPLICATION FILED JUNE 8, 1917.
1,267,974.
Patented May 28, 1918.
2 SHEETS—SHEET 2.
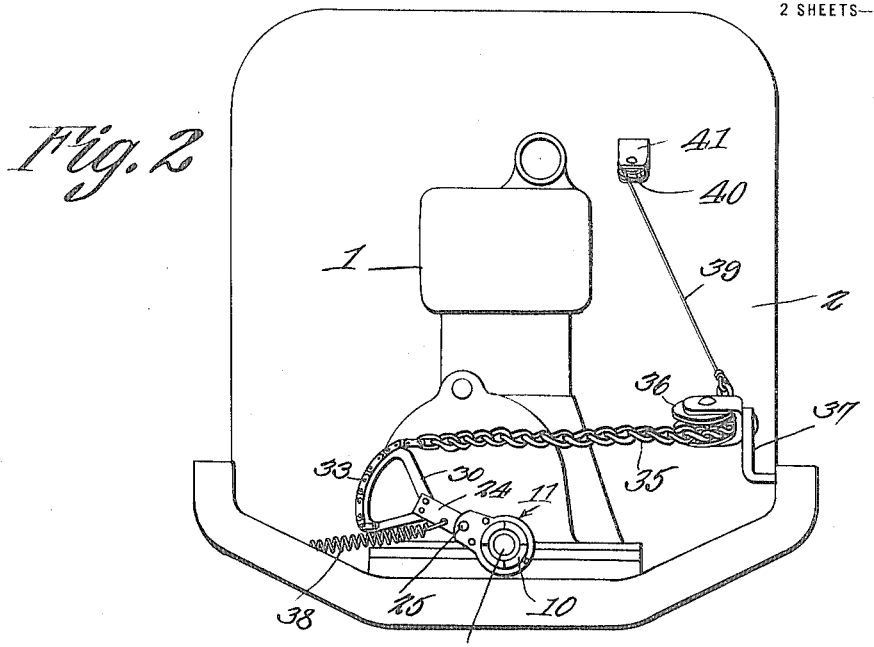
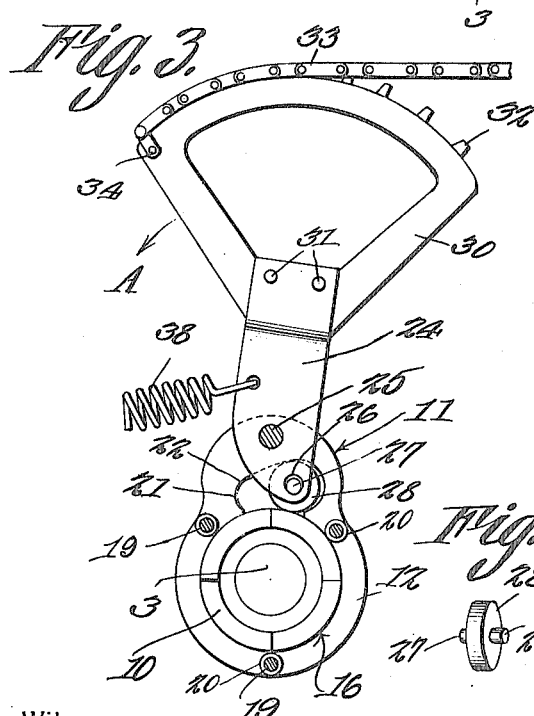
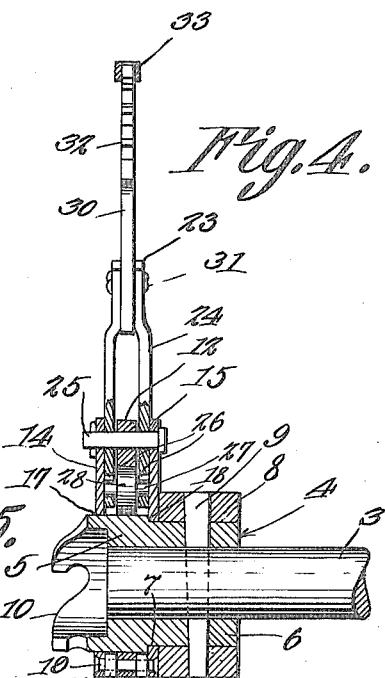
Witnesses
H. O. Clark, Inventor,
by Attorneys.

UNITED STATES PATENT OFFICE.

HORACE O. CLARK, OF CHICAGO, ILLINOIS.

ENGINE-STARTER.

1,267,974.  Specification of Letters Patent.  Patented May 28, 1918.

Application filed June 8, 1917. Serial No. 173,638.

*To all whom it may concern:*

Be it known that I, HORACE O. CLARK, a citizen of the United States, residing at Chicago, in the county of Cook and State of Illinois, have invented a new and useful Engine-Starter, of which the following is a specification.

The device forming the subject matter of this application is adapted to be employed for cranking up the engine on an automobile from a point remote from the engine and within the contour of the body of the vehicle.

One object of the invention is to provide novel means whereby a swinging lever is made effective first to grip the engine shaft and then to rotate the shaft.

A further object of the invention is to provide novel means whereby the lever may be actuated from a remote point on the vehicle.

With the above and other objects in view, the invention consists in the novel construction and arrangement of parts hereinafter described and shown in the drawings, it being understood that, within the scope of what is claimed, changes in the form and the proportions of parts, may be made, without departing from the spirit of the invention.

In the drawings:—

Figure 1 shows in side elevation, a portion of an automobile, the starter hereinafter described being mounted thereon;

Fig. 2 is a front elevation, showing a vehicle upon which the starter has been mounted;

Fig. 3 is an elevation showing the operating lever and attendant parts in place on the engine shaft, one of the plates of the head whereon the lever is fulcrumed being removed, and parts appearing in section;

Fig. 4 is a sectional view of the mechanism delineated in Fig. 3.

Fig. 5 is a perspective, showing the clamping roller.

In the drawings there is shown a part of an automobile including a dashboard 2, and an engine 1 comprising a shaft 3. A collar 4 is fixed to the shaft 3 and constitutes a part thereof. The collar 4 includes a body 5 and a reduced neck 6, these parts defining a circumscribing shoulder 7 in the collar. The shaft 3 is received in the collar 4. A pulley 8 surrounds the neck 6. A pin 9 engages the pulley 8 and the neck 6 and holds the collar 4 and the pulley on the shaft 3 for rotation therewith. The forward end of the body 5 of the collar 4 is provided with a clutch 10 so that, if desired, the shaft 3 may be rotated in the usual manner by a starting crank (not shown).

A head denoted generally by the numeral 11 is mounted to rock on the collar 4. The head 11 includes an intermediate plate 12, a front plate 14, and a rear plate 15.

The intermediate plate 12 has an opening 16 which receives the body 5 of the collar 4. The front plate 14 is provided with an opening 17 which also receives the body 5. The rear plate 15 is provided with an opening 18 which receives the neck 6 of the collar 4, the opening 18 being of smaller diameter than the openings 16 and 17. It will now be noted that the rear plate 15 is held for swinging movement, between the shoulder 7 and the pulley 8, the pulley 8 constituting means for actuating the fan belt (not shown). The construction is such that although the head 11 can rotate on the collar 4, the head, nevertheless, cannot move longitudinally of the collar, or become detached therefrom. The plates 12, 14 and 15, of the head 11 are connected by securing devices 19 carrying spacing collars 20 disposed between the various plates. A recess 21 is formed in the intermediate plate 12 and communicates with the central opening 16 in the plate. The recess 21 has an inclined cam edge 22.

The numeral 23 denotes a lever which may be made up of spaced plates 24, the lower ends of which lie between the intermediate plate 12 of the head 11, upon the one hand, and the plates 14 and 15 of the head, upon the other hand. The upper ends of the plates 12, 14 and 15 of the head 11 support a fulcrum pin 25 on which the lever 23 is mounted to swing, transversely of the shaft 3. The constituent plates 24 of the lever 23 are provided near their lower ends with slots 26 which are elongated longitudinally of the lever 24. Journaled in the slots 26 are the shafts of a roller 28 located within the recess 21 of the intermediate plate 12. One end of a retractile spring 38 is attached to the lever 24, the other end of the retractile spring being attached to some accessible part of the vehicle frame. A segment 30 is mounted at its lower end between the upper ends of the lever plates 24 and is secured thereto as shown at 31. The teeth of the segment are marked by the reference numeral 32.

The teeth 32 of the segment 30 coact with a sprocket chain 33, one end of which is secured at 34 to the segment 30. The other end of the sprocket chain 33 is connected with a flexible element, such as an ordinary link chain 35. The chain 35 is rove across a sheave 36 journaled on a bracket 37 carried by the vehicle frame, the sheave being disposed in a plane which is upwardly and rearwardly inclined. The rear end of the chain 35 is connected with a flexible element 39 of any desired sort. A piece of piano wire may be used advantageously at 39. The flexible element 39 passes across a sheave 40 mounted to rotate on a bracket 41 carried by the dashboard 2, the sheave being downwardly and forwardly inclined as shown in Fig. 1. The flexible element 39 passes slidably through the dashboard 2, and between the side arms of a U-shaped support 42, attached to the dashboard, the rear end of the support being downwardly inclined as shown at 43. A grooved wheel 44 is journaled between the side arms of the support 43, and the flexible element 39 engages the lower edge of the wheel. A handle 45 is attached to the rear end of the flexible element 39 and rests in contact with the upper edge of the downwardly inclined end 43 of the support 42.

In practical operation, the spring 38 swings the lever 23 on pin 25 in the direction of the arrow A in Fig. 3. The roller 28 is carried in an opposite direction toward the wider end of the recess 21 and exerts no gripping action on the body 5 of the collar 4. The collar 4 may now rotate with the shaft 3, when the engine 1 is in operation. When it is desired to crank up the engine 1, a pull is exerted on the flexible element 39 by means of the handle 45, the sprocket chain 35 riding off the teeth 32 and the lever 23 being swung in a direction opposite to that indicated by the arrow A in Fig. 3. The roller 28 traverses the cam edge 22 of the recess 21 and is crowded down into engagement with the body 5 of the collar 4, such an operation being possible because the shafts 27 of the roller have a limited movement, longitudinally of the lever 23, in the elongated slots 26. When the swinging movement of the lever 23 is continued, the collar 4 and consequently the shaft 3 will be rotated, thereby effecting a cranking up of the engine. When the handle 45 is released, the parts are restored to the positions of Fig. 3, under the action of the spring 38, whereupon as many impulses as necessary may be imparted to the shaft 3.

What is claimed is:

1. In a device of the class described, a shaft; a head mounted to rotate thereon and having a cam; a lever fulcrumed on the head; and a shaft engaging clamping roller journaled on the lever for limited movement longitudinally of the lever, the roller being forced against the shaft by the action of the cam when the lever is swung.

2. In a device of the class described, a shaft; a collar on the shaft and including a body and a reduced neck defining a shoulder; a retainer on the neck; a head including a rear plate received rotatably between the shoulder and the retainer, a forward plate rotatable on the head, an intermediate plate rotatable on the head, and means for connecting the plates, the intermediate plate having a recess including a cam edge; a lever including forks disposed between the forward and rear plates, and fulcrumed on certain of the plates; and a collar-engaging clamping roller movable in the recess and journaled in the forward and rear plates for limited movement longitudinally of the lever, the roller being forced against the collar by the action of the cam edge, when the lever is swung.

3. A device constructed in accordance with claim 1, in combination with spring means for swinging the lever on the head, thereby to release the cam from the roller.

In testimony that I claim the foregoing as my own, I have hereto affixed my signature in the presence of two witnesses.

HORACE O. CLARK.

Witnesses:
  Ivy E. Simpson,
  Mason B. Lawton.